Dec. 7, 1943.  C. V. EVERETT  2,336,002
VARIABLE SPEED TRANSMISSION AND CLUTCH
Filed Nov. 21, 1941   4 Sheets-Sheet 1

INVENTOR.
CHARLES V. EVERETT
BY
ATTORNEY

Dec. 7, 1943.  C. V. EVERETT  2,336,002
VARIABLE SPEED TRANSMISSION AND CLUTCH
Filed Nov. 21, 1941  4 Sheets-Sheet 3
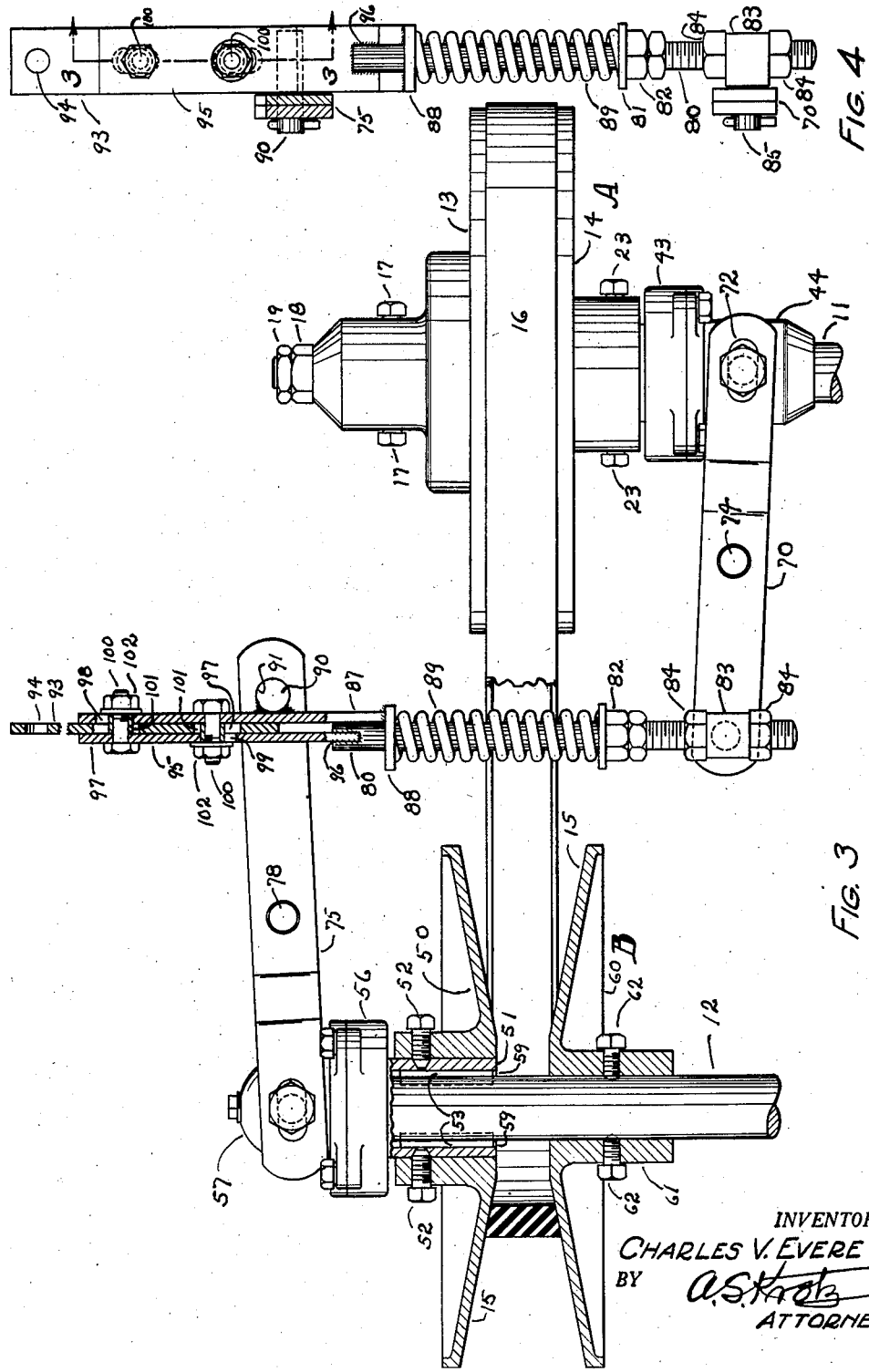
INVENTOR.
CHARLES V. EVERETT
BY
*A.S.Krotz*
ATTORNEY

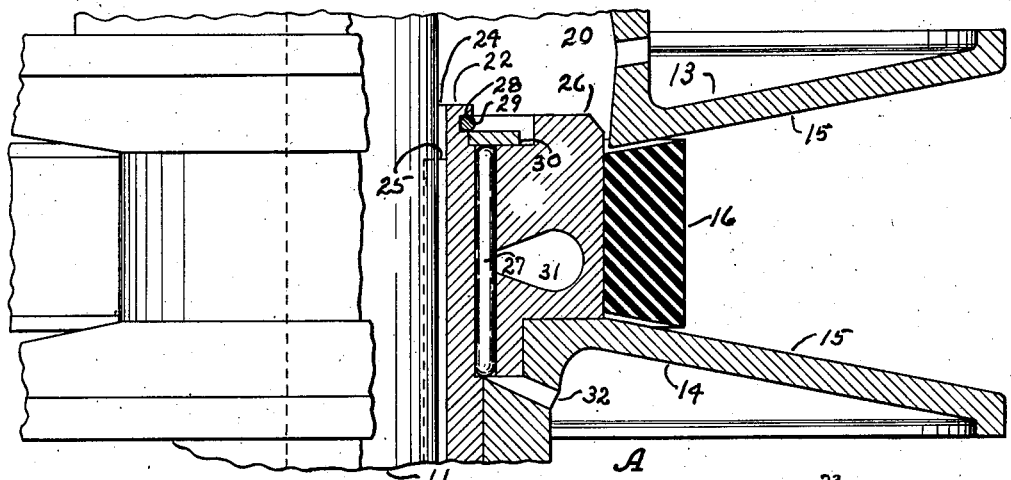
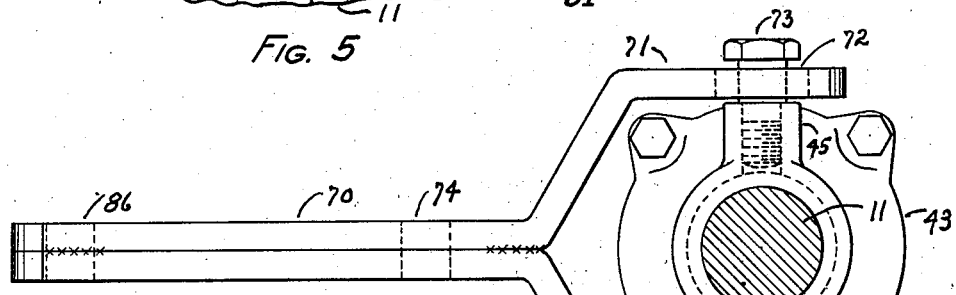
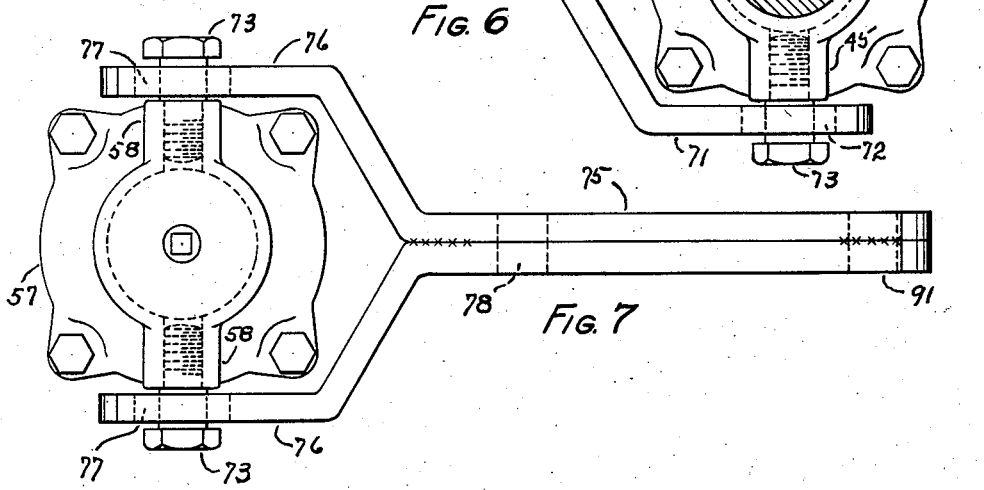

Patented Dec. 7, 1943

2,336,002

UNITED STATES PATENT OFFICE 2,336,002

VARIABLE SPEED TRANSMISSION AND CLUTCH

Charles V. Everett, Racine, Wis., assignor to The Massey-Harris Company, Racine, Wis., a company of Maryland Application November 21, 1941, Serial No. 419,876

3 Claims. (Cl. 74—230.17)

The present invention relates to a variable speed transmission and a clutch associated therewith wherein a single manually operated lever acts to throw the clutch in and out and change the speed between the driver and driven members, the organization being such as will provide means whereby the clutch action can only take place when the transmission is in a starting or low speed position.

One of the outstanding characteristics of my device is that when the transmission is in action, shifting from one speed to another or throwing the clutch in or out requires but a light pressure on the control lever and wherein the changes may be quickly and easily made by anyone capable of driving a tractor.

The present invention includes a V-belt and suitable sheave pulleys, one side of each sheave being shiftable to and from its other half for high, low, or intermediate speeds and means are provided whereby when the belt is shifted to its lowest speed position, a further movement of the control lever will cause the driver sheave faces to move out of contact with the belt and allow the belt to rest on the free pulley or collar on the driver shaft, thus to provide a connecting and disconnecting means which will act similar to a clutch.

Generally stated, it may be said that an object of the present invention is to provide a variable speed transmission which may be quickly and easily operated from one ratio to another or from high to low speed and having a throwing on and off clutch associated with the movement which can be operated only at the low speed position.

From the foregoing it will be seen that I have provided a transmission which is especially suited for transmitting engine power to the ground wheels of a self propelled combine harvester and the like or for starting and stopping and operating machinery of various kinds at variable speeds.

To these and other useful ends, my invention consists of parts, combination of parts, or their equivalents and mode of operation, as hereinafter set forth and claimed and shown in the accompanying drawings in which:

Fig. 3 is a top partially sectioned view of the device showing the belt in position for high speed.

Fig. 4 is a side view of the medial parts of the controlling connections.

Fig. 5 is a partially sectioned top view of the driver sheave with the clutch disengaged.

Fig. 6 is an end view of the clutch operating lever as connected to its thrust bearing.

Fig. 7 is the driven member lever showing its connection to its thrust bearing.

Figure 1:
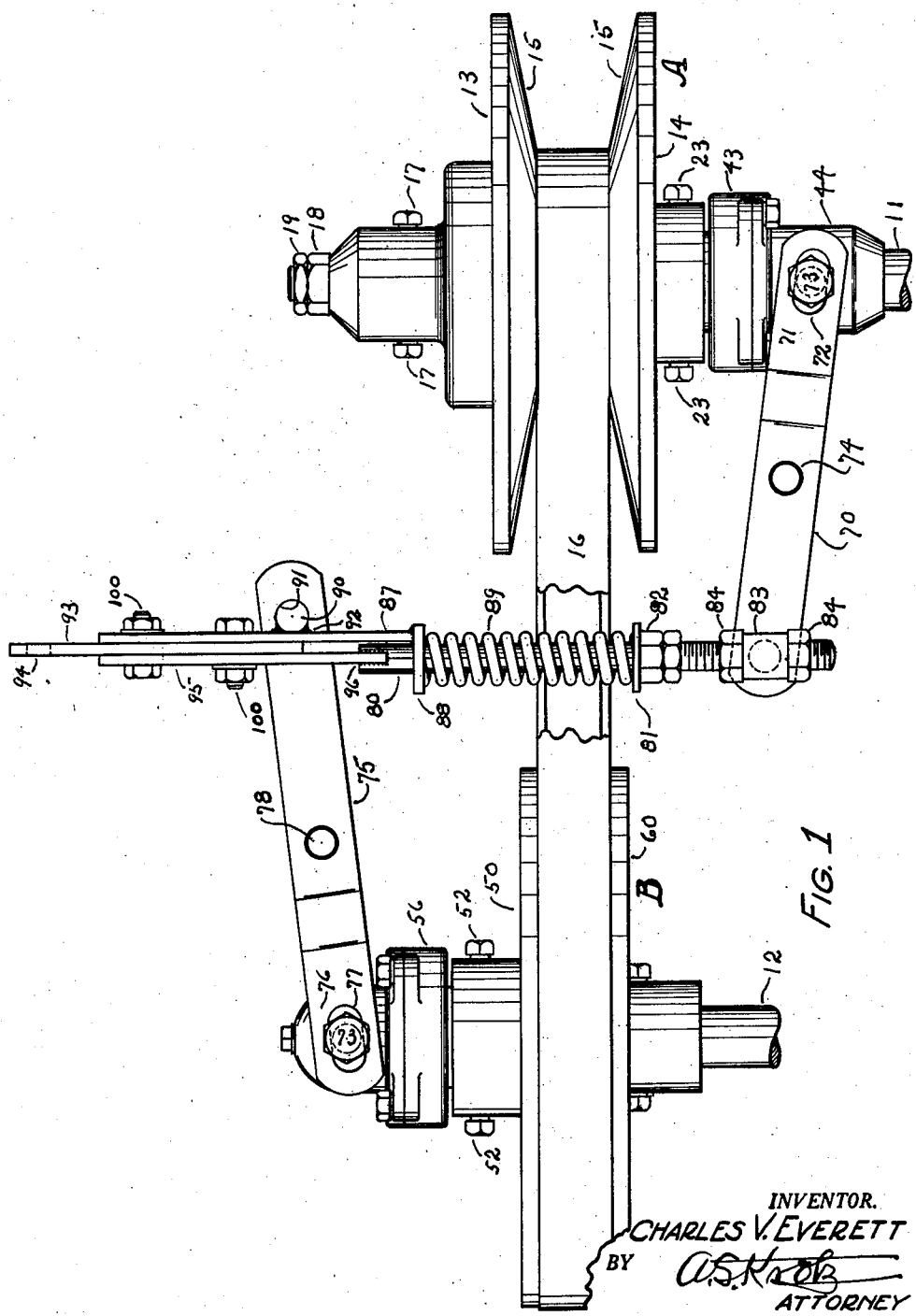
Fig. 1 is a top plan view of my improved transmission and clutch illustrating the position of the sheaves when the device is operating at low speed.

In the figures, numeral 11 designates the driving shaft. When this device is used as a transmission on a tractor, combine harvester and the like, this member may be the protruding end of the crank shaft or it may be an extension of the crank shaft having a flexible coupling therebetween and a suitable bearing or bearings. Numeral 12 designates the driven shaft.

I provide V-belt pulleys which in their entireties are designated by reference characters A and B. Pulley A is made in two parts 13 and 14 each having inner angled surfaces 15 suitable for contact with the sides of V-belt 16 (see Figure 2). Member 13 is preferably rigidly anchored to shaft 11 by means of bolts 17 which extend into the shaft and a holding nut 18 and a locking nut 19.

Member 13 is provided with an opening 20 for a purpose which will hereinafter appear. Member 14 is provided with a sleeve 22 which is preferably anchored to the hub of this member by means of bolts 23—23.

Member 22 is provided with a key-way 24 and member 11 is provided with a key-way suitable for the reception of a key 25 which is slidably embraced by key-way 24. Thus it will be seen that member 14 is spline mounted on shaft 11. An idler pulley 26 is rotatably mounted on member 22 preferably by means of needle bearings 27. Member 22 is provided with a groove 28 adapted to receive a snap ring 29.

Figure 2:
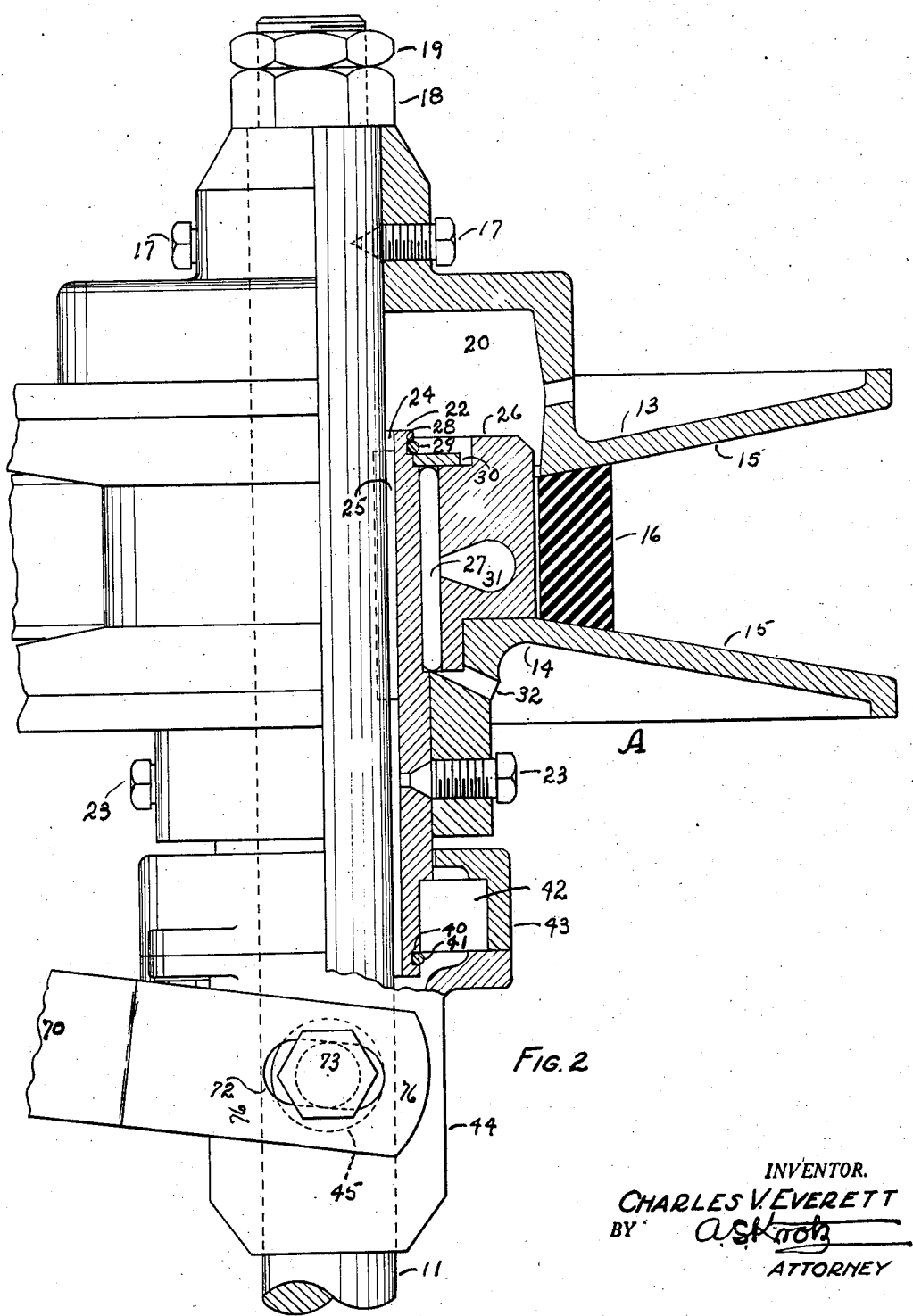
Fig. 2 is a fractional partially sectioned view of the driver sheave showing the position of the parts when operating at low speed.

A washer 30 is provided and rotatably anchors member 26 to member 14 (see Figure 2). Member 26 is provided with a pocket 31 for the reception of oil and an aperture 32 is provided with which to supply lubrication to the needle bearing. The inner end of member 22 is provided with a groove 40 having a snap ring 41 and adapted to hold an anti-friction thrust bearing 42 into position.

Bearing 42 is provided with a housing 43, the housing having a projection 44 which may be slidably mounted on shaft 11. Member 44 is provided with oppositely positioned projections 45 to which its operating lever is secured, as will hereinafter appear.

Member B is very similar to member A having a slidably mounted portion 50 which is similar to member 14 of member A and is provided with a sleeve 51 which is anchored to member 50 by means of bolts 52. Member 51 is adapted to receive a roller thrust bearing 42 (not shown).

Bearing 42 is provided with a housing 56 having a forwardly extending member 57. Member 57 is provided with projections 58—58 which are similar to projections 45 on member 44; the object of which will hereinafter appear.

The other half of member B is designated by reference numeral 60 having a hub 61 which is preferably anchored to shaft 12 by means of bolts 62. Member 51 is provided with key-ways 59 and keys 53 are fitted into key seats in shaft 12 so member 50 is spline mounted on the shaft. Clearly member 50 may be adjusted longitudinally for the different positions of the belt similar to the adjustments of member 14 of member A. By scrutinizing Figure 1, it will be seen that the low speed position is shown. That is, shaft 12 will be turned at the lowest speed relative to shaft 11.

In Figure 3, members 13 and 14 are shown moved to their closet position and members 50 and 60 are shown moved to their widest position for the highest speed whereby shaft 12 will be operated at its highest speed relative to shaft 11, therefore by moving members 50 and 14 simultaneously in opposite directions, it will be seen that various speed ratios may be secured.

When the device is positioned for the lowest speed ratio, the belt will be in the position substantially as shown in Figures 1 and 2 and the belt will be in the position shown in Figure 3 when the transmission is set for the highest speed ratio.

It will be seen that if members 13 and 14 are moved slightly further apart than shown in Figures 1 and 2 and members 50 and 60 are moved closer together, the belt will find a position similar to that shown in Figure 5, resting on member 26 and be out of contact with surfaces 15 of members 13 and 14; thus shaft 11 may turn without moving the belt and member 26 and its associated parts will act as a clutch and, as clearly illustrated, the clutch can only be engaged or disengaged when the transmission is in lowest speed position.

By referring to Figures 1, 3, 6 and 7, it will be seen that I provide a lever 70 having forked members 71 which straddle members 45. The forked ends of members 70 are provided with slots 72. Bolts 73—73 are provided, the bodies of which fit loosely into slots 72, the inner ends being screw threaded into members 45; thus levers 70 may turn on an axis at 74 to thereby move member 14 longitudinally on the shaft.

I provide another lever 75 having forked ends 76—76 with slots 77—77. Two bolts 73 are supplied for forming an operating connection between the lever and projections 58. Lever 75 is pivotally mounted on an anchor as at 78, thus the free ends of levers 70 and 75 may be moved in unison in the same direction and members A and B will be caused to shift the belt from one speed to another, as already explained.

I provide preferably the following means for shifting levers 70 and 75 on their axes 74 and 78:

A shaft 80 is threaded as illustrated and having a washer 81 and an adjusting nut 82 with a suitable locking nut. A block 83 is slidably mounted on one end of member 80 and being held in a predetermined position by means of nuts 84—84. Block 83 is provided with a circular projection 85 adapted to extend through an opening 86 in lever 70. I provide a bar 87 having a right angle piece 88 which is slidably mounted on member 80. A spring 89 is mounted between members 88 and 81 for a purpose which will hereinafter appear.

A bolt 90 rotatably extends through opening 91 in lever 75 and is in turn welded to member 87 as at 92. By scrutinizing Figure 1, it will be seen that spring 89 will act to move the free ends of members 70 and 75 apart.

I provide a link 93 having an opening 94 for connection to a hand operated lever. The inner end of a plate 95 is welded to bolt 80 as at 96. Member 93 is adapted to fit freely between members 87 and 95 and is provided with slotted openings 97—97. Member 87 is provided with a slotted opening 98 and member 95 is provided with a slotted opening 99. Normally openings 97, 98 and 99 will be in the position as shown in Figure 3.

I provide bolts 100—100 each having a sleeve 101 which is adapted to fit loosely into slots 97, 98 and 99 but having a length so when nuts 102 are made taut, member 93 may be freely moved longitudinally.

If the transmission is in the position shown in Figure 3 and bar 93 is moved toward the transmission, it will engage sleeve 101 secured to bar 87 and move this sleeve; thus to slightly release the belt between members 50 and 60 and tighten the belt between members 13 and 14. If bar 93 (see Figure 3) is moved in a direction away from the transmission, then slot 97 will contact sleeve 101 which is rigidly secured to member 95 and act to move rod 80 in the same direction, thus to first move members 13 and 14 apart. A further movement of bar 93 would then cause member 50 to move toward member 60 and since the belt has already been slightly loosened between members 13 and 14, it will then shift toward a lower speed position.

When the transmission is in the position shown in Figure 1 and member 93 is moved toward the transmission, the movement will first act to spread members 50 and 60 apart so as to loosen the belt. A further movement will then cause member 50 to move away from member 60 and member 14 to move toward member 13 and the belt will be caused to shift toward a higher speed position.

It will be seen that when the control lever is moved to shift the belt in either direction, the belt is first loosened after which both of the sliding sheaves will move simultaneously as long as pressure is applied to the lever and immediately upon releasing the pressure on the lever, spring 89 will act to tighten the belt between the sheaves. This feature provides easy shifting from one speed to another which could not be otherwise accomplished.

It will be seen that with the belt in any position between the working surfaces of members A and B, yielding contact pressure will be provided by spring 89 and that this yielding pressure may easily be adjusted by means of nut 82.

Clearly the yielding contact pressure against the sides of belt 16 will be constant except when shifting and equalized in any position of the belt because of spring 89 and by moving link 93, the position of the belt may be changed from high to low or low to high speed or to any intermediate speed desired.

It will be seen that when the transmission is moved to the lowest speed, a slightly further movement will disengage the belt and then this movement is reversed, the belt will be reengaged so that this movement is equivalent to the action of a clutch but differing from the ordinary self propelled vehicle clutch in that the clutch can only be engaged and disengaged when the device is in the lowest speed position.

It will be seen that I have provided a simple easily understood device that can be operated by anybody capable of driving a tractor or self propelled vehicle.

Having thus shown and described my invention, I claim:

1. A device of the class described, comprising spaced driving and driven shafts, V-belt pulleys mounted on said shafts and a V-belt forming an operating connection therebetween, each said pulleys comprising two belt contacting members, one of each said members being spline mounted on the shaft, the other member being rigidly secured to its shaft, levers pivotally mounted intermediate their ends and having at their outer ends an operating connection to the adjacent splined member, operating connections between the inner ends of said levers having means to cause a yielding pressure to be exerted against the sides of said belt, said connections having a manually operated element with a limited slidable movement therebetween and means for engaging one of said connections in advance of the other in either direction to thereby first loosen said belt and then engage both of said connections whereby further movement will change the speed ratio between pulleys and whereby said yielding means will again operate after said manually operated connection is released.

2. A device as recited in claim 1 including; a rotatably mounted relatively small in diameter clutch pulley mounted between said driving shaft pulley members, an opening in one of said driving shaft pulley members adapted to freely receive said clutch pulley to thereby permit said speed adjustments, means for an extreme movement of said driving pulley members whereby the belt will be released at its driven end and permitted to rest on said clutch pulley.

3. A device as recited in claim 1 including; adjusting means on said last operating connection whereby the pressure against the sides of said belt may be adjusted.

CHARLES V. EVERETT.